No. 871,718. PATENTED NOV. 19, 1907.
A. B. MACKLIN.
LOCK NUT.
APPLICATION FILED MAR. 20, 1907.
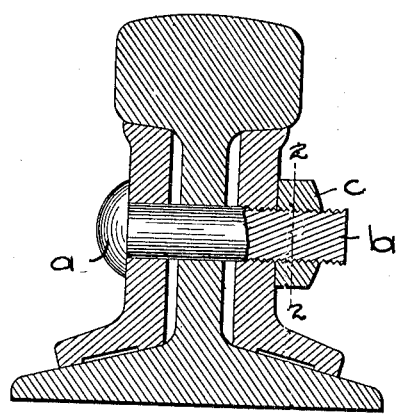
FIG. 1.
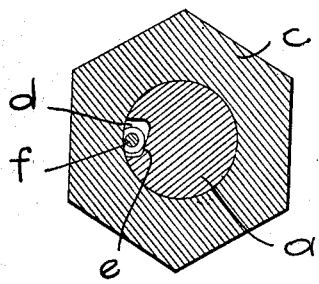       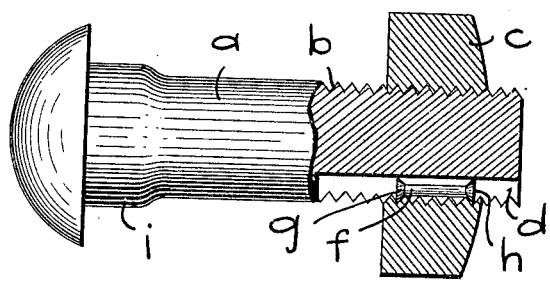
FIG. 2.              FIG. 3.
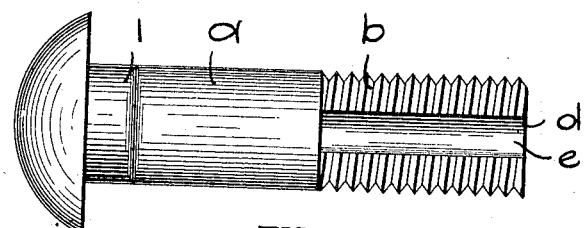
FIG. 4.
   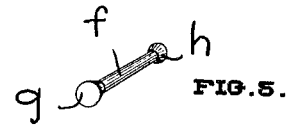
FIG. 6.     FIG. 5.
WITNESSES
Wm A. Wyman
R. S. Smart
INVENTOR
A. B. MACKLIN
BY Fred B. Feuerstenhaupt
ATT'Y.

UNITED STATES PATENT OFFICE.

ATHOL BRANT MACKLIN, OF OTTAWA, ONTARIO, CANADA.

NUT-LOCK.

No. 871,718.　　　Specification of Letters Patent.　　　Patented Nov. 19, 1907.

Application filed March 20, 1907. Serial No. 363,484.

*To all whom it may concern:*

Be it known that I, ATHOL BRANT MACKLIN, of the city of Ottawa, in the county of Carleton, Province of Ontario, Canada, have invented certain new and useful Improvements in Lock-Nuts, of which the following is a specification.

My invention relates to improvements in lock nuts, and the objects of my invention are to provide a lock nut of maximum efficiency and minimum cost; and it consists essentially of a bolt having a longitudinal recess therein, having an inclined rear wall, a locking pin operating in the recess and adapted, in one position, to jam against the thread of the nut on the bolt and, in another position, to be free from contact therewith, the arrangement of the recess being such that the pin is normally gravity held in locking position; the details of the device being more fully set forth and described in the accompanying specifications and drawings.

Figure 1 is a transverse sectional view of a rail-joint as locked by my invention; Fig. 2 is a transverse sectional view on the line 2—2, Fig. 1; Fig. 3 is a longitudinal view, partly in section, of my nut; Fig. 4 is a detail view of the bolt; Fig. 5 is a perspective view of the locking-pin; and Fig. 6 is a detail of a key, which may be employed to hold the pin out of locking-position to effect removal of the nut.

In the drawings like letters of reference indicate corresponding parts in each figure.

Referring to the drawings, $a$ is the bolt of any suitable construction, having external screw-threading $b$ thereon, and $c$ is the nut of usual construction, adapted to screw on the bolt. The bolt has cut, or otherwise formed, therein, a longitudinal recess $d$, the rear wall $e$ of which, is inclined, as shown, whereby the depth of the recess will be less at one side, than the other.

Operating in the recess, is the locking pin $f$, which may be formed in a variety of ways, the essential feature being that when it is in the shallowest part of the recess $d$, it shall bind the threads of the nut, and when in the deepest part, shall be free from contact therewith. The pin is preferably cylindrical as shown, and is provided with means for preventing longitudinal movement thereof, such as the outwardly flared and enlarged ends $g$ and $h$, which have the acute faces thereof adapted to fit in the threads of the nut. These flared ends, in addition to preventing longitudinal movement, cause the jamming of the pin to act against the sides of the thread of the nut, instead of against the edge.

In practice, to keep the locking pin normally in locking position when the bolt extends horizontally, the recess $d$ is so arranged, with reference to the permanent position of the bolt, that the pin will be normally gravity held in locking position. To effect this, suitable means must be provided on the bolt, to prevent rotation thereof, and the well known means I show for this, comprises an oval section $i$ formed on the end of the bolt.

It will be observed that my lock nut is distinguished from a variety of similar nuts, in which pins are locked in longitudinal recesses in the bolts by the fact, that in my device, the pin is of smaller size than the recess and free to roll therein, thus producing a locking action when at one end, but leaving the nut perfectly free when it is at the other.

In operation, the pin is first placed in position in the recess and the nut screwed home. In tightening the nut the direction of rotation is such as to force the pin away from its locking position but when once screwed to its innermost position, any attempt to unscrew the nut, rolls the pin to the shallowest side of the recess, where it jams against the thread of the nut, and effectually prevents the unscrewing thereof. This locking action is entirely independent of the position of the nut, and for this reason, it possesses a great advantage over those forms of locking devices in which the locking action would be dependent on or influenced by the position of the nut.

Where the plain cylindrical locking pin is used, the nut may be screwed home prior to the insertion of the pin. If it is desired to remove the nut, a key $j$, of smaller diameter than the locking pin, such as shown in Fig. 6, is inserted in the shallowest end of the recess, which will move the locking pin into the deeper part of the recess and out of contact with the thread of the nut, which latter may then be unscrewed.

While the device has been described herein, with great particularity of detail, yet, it will be readily understood that in carrying out the construction of the same, certain changes may be made within the scope of the appended claims, without departing from the spirit of the invention.

What I claim as my invention is:—

A lock-nut including in combination a bolt having a longitudinal recess therein with an inclined rear wall, means on the bolt preventing rotation thereof, and a locking-pin operating in the recess, and comprising a smooth central cylindrical portion adapted to engage the edges of the threads on the nut, and a head at each end of the cylindrical portion, each said head having, on one side thereof, a flat, circular face terminating in a sharp edge and, on the other side thereof, a flaring face, each said head being adapted to extend between the bolt-threads the entire depth thereof.

Signed at Ottawa in the Province of Ontario, this 14th day of March, 1907.

ATHOL BRANT MACKLIN.

Witnesses:
    RUSSEL S. SMART,
    WM. A. WYMAN.